US012569768B2

(12) United States Patent
Dymock et al.

(10) Patent No.: US 12,569,768 B2
(45) Date of Patent: Mar. 10, 2026

(54) ANALYSIS OF A USER-CREATED GAME OBJECT TO CHARACTERIZE FEATURES AND PERFORMANCE STATISTICS

(71) Applicant: VRChat Inc., San Francisco, CA (US)

(72) Inventors: Derrick James Dymock, Irvine, CA (US); Euan Polson, Aberdeen (GB); Jesse Joudrey, Port Coquitlam (CA)

(73) Assignee: VRCHAT INC., San Francisco, CA (US)

( * ) Notice: Subject to any disclaimer, the term of this patent is extended or adjusted under 35 U.S.C. 154(b) by 324 days.

(21) Appl. No.: 18/497,621

(22) Filed: Oct. 30, 2023

(65) Prior Publication Data

US 2025/0135351 A1 May 1, 2025

(51) Int. Cl.
*A63F 13/63* (2014.01)
*A63F 13/35* (2014.01)
*A63F 13/70* (2014.01)

(52) U.S. Cl.
CPC .............. *A63F 13/63* (2014.09); *A63F 13/35* (2014.09); *A63F 13/70* (2014.09)

(58) Field of Classification Search
None
See application file for complete search history.

(56) References Cited

U.S. PATENT DOCUMENTS

2008/0045283 A1* 2/2008 Stamper .................. A63F 13/58
463/1
2012/0209571 A1* 8/2012 Peterson ............. G06F 11/3698
702/186

OTHER PUBLICATIONS

"Testing and quality assurance tips for unity projects" via WayBack Machine—https://unity.com/how-to/testing-and-quality-assurance-tips-unity-projects, Sep. 24, 2023 (Year: 2023).*
Unity Documentation Manual—Profiler overview via WayBack Machine—https://web.archive.org/web/20230923004630/https://docs.unity3d.com/Manual/Profiler.html, Sep. 23, 2023 (Year: 2023).*
YouTube video: How to customize performance metrics in the Unity Profiler | Unite 2022 to Unity—https://www.youtube.com/watch?v=ixEk6EWrL6Y, Nov. 18, 2022 (Year: 2022).*

* cited by examiner

*Primary Examiner* — Damon J Pierce
(74) *Attorney, Agent, or Firm* — Polsinelli PC

(57) ABSTRACT

The present technology pertains to analyzing a user-created game object at a platform server to characterize features of the user-created game object. The present technology can further generate statistics indicative of the estimated performance of user-created game objects and modify the user-created game objects in accordance to improve their performance or to bring them into compliance with a software development kit. Further, client applications can include configurations to determine whether to download a user-created game object based on the statistics indicative of the estimated performance of user-created game objects.

20 Claims, 5 Drawing Sheets

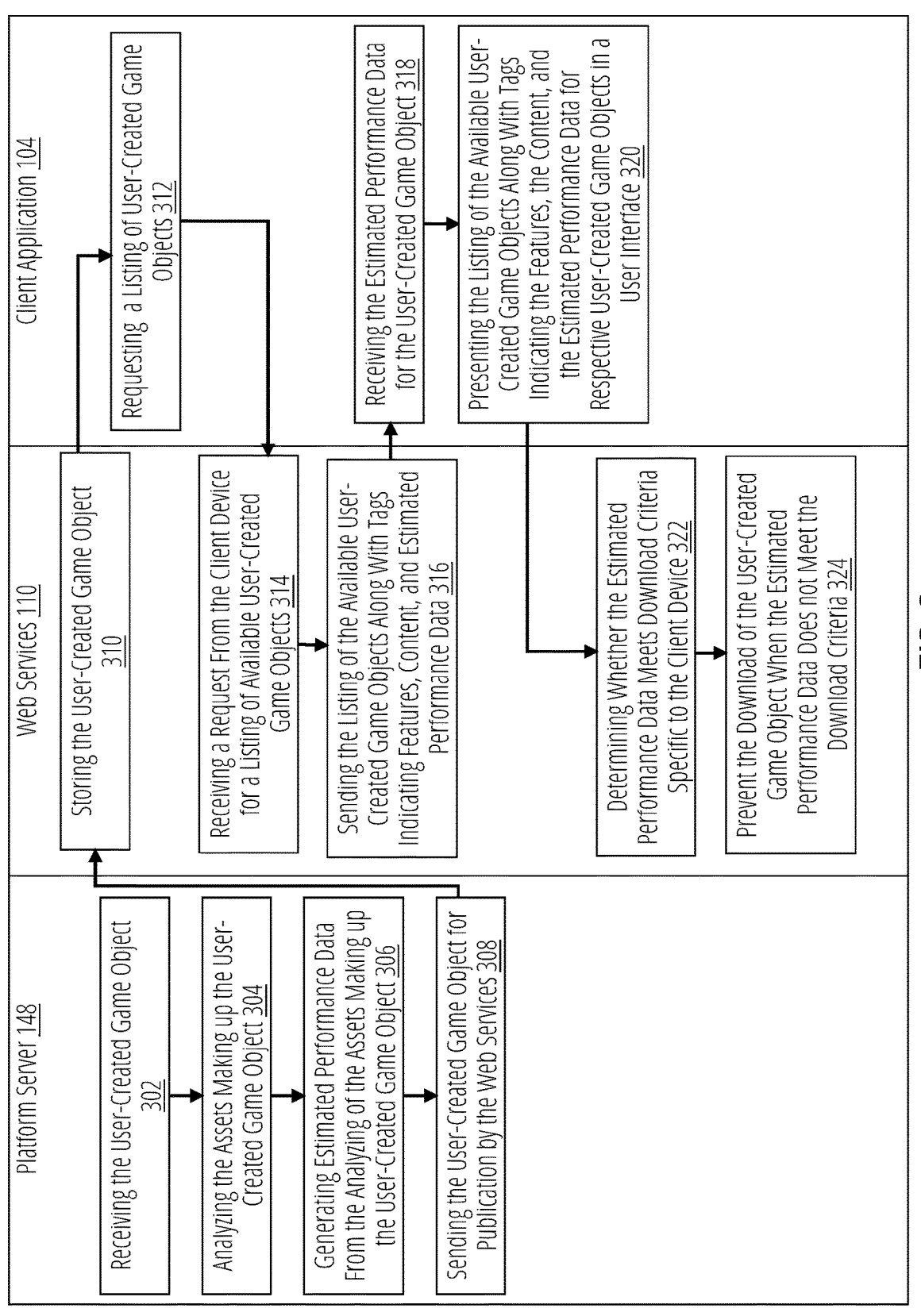

FIG. 3

Client Application 104

Requesting a Listing of User-Created Game Objects 312

Receiving the Estimated Performance Data for the User-Created Game Object 318

Presenting the Listing of the Available User-Created Game Objects Along With Tags Indicating the Features, the Content, and the Estimated Performance Data for Respective User-Created Game Objects in a User Interface 320

Web Services 110

Storing the User-Created Game Object 310

Receiving a Request From the Client Device for a Listing of Available User-Created Game Objects 314

Sending the Listing of the Available User-Created Game Objects Along With Tags Indicating Features, Content, and Estimated Performance Data 316

Determining Whether the Estimated Performance Data Meets Download Criteria Specific to the Client Device 322

Prevent the Download of the User-Created Game Object When the Estimated Performance Data Does not Meet the Download Criteria 324

Platform Server 148

Receiving the User-Created Game Object 302

Analyzing the Assets Making up the User-Created Game Object 304

Generating Estimated Performance Data From the Analyzing of the Assets Making up the User-Created Game Object 306

Sending the User-Created Game Object for Publication by the Web Services 308

ANALYSIS OF A USER-CREATED GAME OBJECT TO CHARACTERIZE FEATURES AND PERFORMANCE STATISTICS

BACKGROUND

Game object distribution platforms are important for developers to distribute their games, avatars, in-app objects, and other game-related software objects to users. Game object distribution platforms play a role in ensuring the quality, safety, and integrity of the gaming experience for users. By subjecting games, avatars, in-app objects, and other game objects to a validation process before making them available for download, game object distribution platforms safeguard the interests of both developers and users. An example type of game object distribution platform is an app store.

Game object distribution platforms prioritize quality assurance by implementing rigorous testing and evaluation procedures. Game submissions undergo thorough inspections for software bugs, performance issues, compatibility across devices and operating systems, and adherence to platform-specific guidelines. By vetting games for quality, game object distribution platforms strive to maintain high standards and deliver a seamless gaming experience to users.

Game object distribution platforms act as gatekeepers, protecting users from potentially harmful or fraudulent games, avatars, in-app objects, and other game objects. Rigorous review processes help identify and prevent the distribution of malicious software, including malware, viruses, and scams. By curating content, game object distribution platforms reduce the risk of data breaches, privacy violations, and financial loss through unauthorized purchases.

BRIEF DESCRIPTION OF THE SEVERAL VIEWS OF THE DRAWINGS

The present technology will be described with reference to the appended drawings. The drawings aid in the description of the present technology and are not to be considered to be limiting the scope of the appended claims. The accompanying drawings include:

FIG. 3 illustrates an example routine for analyzing a user-created game object at a platform server to characterize features and performance statistics of the user-created game object in accordance with some aspects of the present technology.

DETAILED DESCRIPTION

Figure 1:
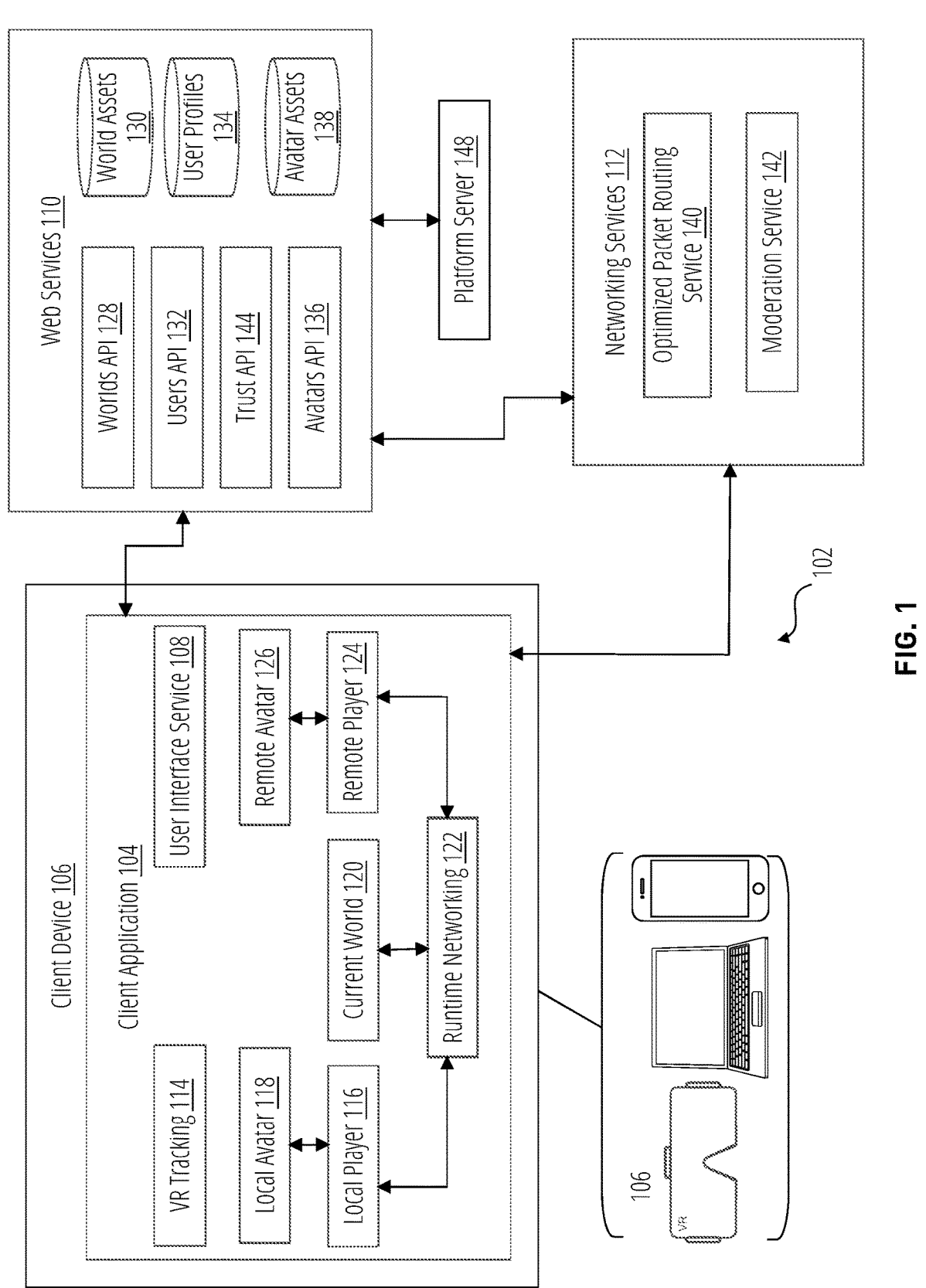
FIG. 1 illustrates an example virtual world platform for playing and hosting a multiplayer virtual reality (VR) experience in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Object distribution platforms distribute games, avatars, in-app objects, and other game-related software objects from developers and make them available for download. Object distribution platforms also validate such content. However, there is no equivalent distribution platform that is open to all users that may generate content.

In an environment in which users generate content, additional complexities exist. Developers are generally approved to generate content for distribution by game object distribution platforms, whereas, in a user-generated content environment, any user can upload content. Developers are more likely to follow platform rules and have more to lose by being banned from uploading content to an object distribution platform. There are also fewer developers than users, which also means there is less content to be validated and hosted in the developer-oriented environment than in the user-oriented environment.

Additionally, while professional developers typically try to respect the intent of rules meant to safeguard platforms, a greater number of users are likely to push the boundaries of what can be included in their content (whether intentionally or unintentionally through somewhat lesser skill levels). Therefore, the types of automated validations that might be performed in existing object distribution platforms might be vulnerable to permitting harmful or poorly performing content to reach other users' devices.

The present technology addresses these challenges by analyzing the content through a variety of checks and analyses. In particular, a user-created game object can be analyzed to ensure that it is compliant with a software development kit and the terms and conditions of a virtual world platform. Some assets that are part of a user-created game object can be modified to be more efficient or compliant with terms and conditions and the software development kit.

Furthermore, the present technology can also send information about the user-created game objects to the client application so that the client application can apply its own rules to decide whether to download or not download a user-created game object.

Accordingly, the present technology addresses these shortcomings in the prior art as well as provides other benefits which will be readily apparent from the description provided herein.

FIG. 1 illustrates an example virtual world platform 102 for playing and hosting a multiplayer virtual reality (VR) experience that is suited to carrying out the present technology. Although the example system depicts particular system components or services and an arrangement of such components and services, this depiction is to facilitate a discussion of the present technology and should not be considered limiting unless specified in the appended claims.

The virtual world platform 102 can connect client applications 104 through web services 110 and networking services 112 to socially interact together in a virtual world hosted by virtual world platform 102.

The virtual world platform 102 primarily includes a client application 104, which is an instance of an application executed on a client device 106. The client application 104 interacts over a network connection with web services 110 which supports client application 104 by providing various services through one or more application programming interfaces (APIs). A few of the main services provided by web services 110 are related to supporting virtual worlds through the worlds API 128, user profiles through the users API 132, trust and safety through the trust API 144, and complex avatars through avatars API 136. Web services 110 generally stores and provides long-term state information among other functions.

The client application 104 also interacts with networking services 112, which provides communication services between client application 104, networking services 112, and a remote instance of client application 104 (not shown) to share state information among respective instances of client application 104. In particular, state information is received from a plurality of instances of client application 104 by networking services 112 as each instance of client application 104 controls its local player 116. Networking services 112 can transfer state information about respective players to other instances of client application 104 when the local players 116 for the respective client instances are all engaged in gameplay in the same virtual world. The networking services 112 provide optimized packet routing through optimized packet routing service 140 and moderation between one or more clients through moderation service 142.

The client application 104 is the runtime environment executing on a particular client device 106. While the present description sometimes refers to client application 104, local client, and remote clients, all are instances of the client application 104 executing on a respective client device 106. One particular user account is logged into a particular instance of client application 104. A local client and remote client are distinguished to illustrate how client application 104 handles first person inputs from a user of the client device 106 upon which client application 104 is executing and handles third party inputs received from another user operating their client device upon which the remote client is executing.

Client device 106 can be any computing device. While client application 104 is particularly adapted to providing an immersive virtual reality experience through interactions that require a VR headset to experience, client application 104 can also be run by computers and mobile devices. Some virtual worlds or complex avatars might not be configured to perform well on certain device types, and therefore, while client application 104 can operate on many platforms and devices, not all virtual worlds or complex avatars will be available or have full functionality on all client devices 106.

User interface service 108 is one service that is part of client application 104. User interface service 108 is configured to provide various user interface elements such as menus that display various user settings, available worlds, saved complex avatars, friends lists, etc. User interface service 108 can populate its menus through interaction with one or more APIs provided by web services 110, while other portions of menus are loaded directly from user interface service 108.

User interface service 108 can provide a menu of available worlds by calling worlds API 128 to retrieve a list of worlds to which the user account logged into client application 104 is permitted to enter. Worlds API 128 can retrieve all public worlds from the world assets database 130 and send a list of those to client application 104. Additionally, worlds API 128 can request world IDs for any private worlds associated with the user account logged into client application 104 and retrieve the private worlds from the world assets database 130 to send to client application 104. User interface service 108 can receive user inputs through a hardware interface to navigate through the worlds menu and to receive a selection of a world to visit.

Another user interface provided by user interface service 108 pertains to various user settings. Such settings can pertain to whether the human player is sitting or standing, settings to minimize motion sickness in players that are susceptible to motion sickness when playing in VR, settings to select a complex avatar, settings about how a player might be viewed and by whom a player might be viewed in a virtual world.

One notable user interface provided by the user interface service 108 is the trust and safety menu. User interface service 108 can contact users API 132 to retrieve current trust and safety settings from user profiles database 134 and display these settings in the trust and safety menu. The trust and safety menu provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client application 104 to which the local user is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic mode to audio-and-visually mute anybody who is not a friend.

After a user has selected a virtual world from the menu provided by the user interface service 108, client application 104 can download an instance of the virtual world by calling the worlds API 128, which can retrieve the virtual world from worlds world assets database 130 and send it to client application 104 for execution.

The world assets are large binary files built for a game engine, such as UNITY using an editor with a software development kit (SDK) provided for use with the virtual world platform 102. If a user travels into a world, they need to download that world asset from world assets database 130. If there are already people in that instance of the world, client application 104 also needs a list of the avatars of those people so that the avatars can be rendered in the instance of the virtual world.

In some embodiments, a function of the worlds API 128 can confirm that the user account can access the requested world. While the user account should only have the ability to view public worlds in the user interface menu or should only have knowledge of links to worlds that have been shared with the user account, the worlds API 128 can confirm the user account is permitted to access the virtual world as a redundancy measure.

In addition to downloading the instance of the virtual world, the client application 104 can also establish a session with networking services 112 for the specific instance of the world. Networking services 112 can provide information about the current state of the instance of the virtual world. For example, networking services 112 can provide a list of remote avatars 126 present in the virtual world instance to client application 104. In turn, client application 104 can contact the avatars API 136 to download complex avatar assets for the list of remote complex avatars from avatar assets database 138.

If the client application 104 does not have assets for the local avatar 118, client application 104 can also contact the avatars API 136 to request and receive the local avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual world, or if the avatar has non-standard movement dynamics.

The downloaded instance of the virtual world can be executed by client application 104 as current world 120. Current world 120 can include coordinates within the current world 120 where the local player 116 and each remote player 124 are located. The local player 116 and remote player 124 are each collision volumes of space that the respective local player 116 or remote player 124 occupy.

The local avatar 118 can be mapped to the local player 116, and the respective remote avatar 126 can be mapped to their respective remote player 124, thereby allowing each player to appear as their avatar in the current world 120. Movements of the remote avatars 126 are handled by receiving state data about a respective remote avatar/player and rendering the movement or audio by client application 104.

The VR tracking service 114 pertains to client applications 104 operating on a client device 106 that have access to VR tracking peripherals. For example, some VR headsets have cameras (integrated or external) to track the limbs of players. Many VR headsets can pair with controllers that can report the locations of a user's hands in space. Some client devices 106 include other peripherals configured to perform full skeleton tracking. VR tracking service 114 can fuse all VR inputs connected to the client.

The VR tracking service 114 can map the fused VR inputs to the local player 116 to allow the local player 116 to interact in and with the current world 120. Meanwhile, the local player 116 can interact with the local avatar 118 to map the local avatar 118 to the local player and make the local player 116 appear as their avatar.

In some embodiments, there is diversity in what parts of a user's body are tracked by VR tracking service 114. While some users might have full skeleton tracking, many users may only have the ability to perform hand tracking. To accommodate this disparity in hardware abilities of possible client devices 106, local player 116 can derive portions of a skeleton that are not tracked by VR tracking service 114. For example, if VR tracking service 114 only provides information about hand tracking for a user, the local player can still derive a full skeleton for the user and make portions of the skeleton move to accommodate the movement of the hands.

In this way, an avatar's hands are not moving in a way that is disembodied from the rest of the avatar.

The local player 116 is the entity that moves around the environment in the current world 120. It can pick things up and put them down. It does not have any animation and is a collision volume. It can do everything in the world, but it has no appearance and does not need to animate.

The local player is further connected to the networking layer, illustrated as the runtime networking service 122, to broadcast state information about the local player 116 over the network to other users in the current world 120 instance.

The local player 116 and the remote player 124 are similar in that they are collision volumes that move around the environment in the current world 120. The main difference is that the local player 116 is controlled by client application 104, and the user of client application 104 is authoring the experience. In contrast, the remote player 124 is a playback mechanism representing actions being broadcast to the client application 104 representing other players present in the current world 120.

As addressed above, the local avatar 118 is overlaid with the local player 116 to give the user a visual appearance. Actions by the local player 116 are animated as the local player interacts with the current world. For example, while the local player 116 can interact to pick up an object in the current world 120, without the local avatar 118, the object would appear to float in the air. With the local avatar 118 overlaid the local player 116, the object now appears to be held by the hand of the avatar.

The remote player 124 and remote avatar 126 work similarly to their local counterparts except for where the inputs that control the remote player 124 come from. The remote player 124 and remote avatar 126 are playback devices for state information received by the runtime networking service 122 from networking services 112. While FIG. 1 only depicts one remote player 124 and remote avatar 126, there can be many.

The current world 120 also has features that require networking. The current world 120 could have objects, like scissors or a light switch, that a user can pick up, and the object needs to broadcast its state across the network so that other users in the current world 120 can view the current state of the object.

Each of the local player 116, current world 120, and remote player 124 are connected to the runtime networking service 122. The local player 116 primarily transmits updated state information for the local player 116 to remote instances of client application 104 that are also executing the same virtual world. The current world 120 can transmit and receive state information about the instance of the virtual world. The current world executing on client application 104 transmits state information when the state change is owned by the local player 116 and receives state information when the state change is owned by the remote player 124.

Networking services 112 are the network-side part of the networking layer of the virtual world platform 102. In some embodiments, portions of the networking services 112 are provided by a networking plug-in such as the PHOTON networking engine, which broadcasts state information to all users in an instance of a virtual world.

In addition to the general broadcasting of state information to all users interacting with an instance of a virtual world, the optimized packet routing service 140 provides more advanced features that provide an enhanced user experience and enforces other virtual world platform 102 properties, such as trust and safety configurations.

For example, to provide an enhanced user experience, the optimized packet routing service 140 can filter out voice packets coming from a remote player 124 that might be far from the local player 116 in the instance of the current world 120. Without such optimization, remote players 124 that are not interacting or even visible to the local player might receive audio packets from tens or even hundreds of remote players 124 that would make it hard to communicate with any subsets of remote players 124.

In another example, the optimized packet routing service 140 can enforce trust and safety configurations. As addressed above, trust and safety configurations can specify specific user accounts or groups of user accounts to be filtered so that they cannot interact with the local player 116 or have limited interactions with the local player 116. The optimized packet routing service 140 can call trust API 144 to learn of a list of remote players 124 that might need to be subject to some level of filtering or blocking of network traffic going to or coming from the client application 104 for the local player 116 having the trust and safety configurations.

The trust API 144 can determine which remote players 124 should be blocked for the local player 116 or which remote players 124 should have aspects of their complex avatar limited. Some of these determinations are based on logic and rules that categorize remote players 124 based on quantities and types of past interactions with the virtual worlds platform 102. Trust API 144 may make these determinations by using settings stored in the user profile of the local player 116 and comparing these settings to data stored in user profiles of remote players 124.

Another of the networking services 112 is a moderation service 142 that can provide conflict resolutions and access control. For example, before a user accesses a world, especially a private world, moderation service 142 can call the worlds API 128 to ensure the user can enter the world. In another example, there can be instances where two different users attempt to claim control of an object in a virtual world at approximately the same time. The moderation service 142 can handle those sorts of conflicts by selecting a particular user to control an object until they relinquish the control of the object, which allows another user to claim control of the object. A user that has control of the object can broadcast packets informing remote players 124 of the state of that object.

In some embodiments, client application 104, virtual worlds, and complex avatars can be configured to operate in a particular game engine, especially a game engine that supports three-dimensional (3D) environments. Two common game engines include UNITY and UNREAL ENGINE.

In some embodiments, to be supported by virtual world platform 102, virtual worlds and complex avatars need to be developed in compliance with a software development kit (SDK). For example, complex avatars require a particular script to be usable in the virtual world platform 102. In another example, there can be a number of requirements that need to be followed to get the animations of an avatar to play. In some embodiments, the SDK can define other necessary details to support particular client devices. For example, the SDK can define specific shaders to be used if the avatar is to be used on the OCULUS QUEST VR headset.

In some embodiments, the SDK requires virtual worlds to utilize a particular coding language to ensure the world has compliant behaviors. For example, the SDK can require that behaviors in worlds are defined using UDON, a programming language specific to a particular virtual world platform

102, VRCHAT. In some embodiments, the programming language facilitates a world built using the programming language to comply with file access safeguards provided by the virtual world platform 102. For example, a world cannot read or write anything to a hard drive, and only approved web pages can be rendered in a world on the virtual world platform 102.

In some embodiments virtual world platform 102 can also include a platform server 148 for validating and compiling user created content prior to storing the compiled content in world assets database 130 or avatar assets database 138.

While the virtual world platform 102 is suited to carrying out the present technology, persons of ordinary skill in the art will appreciate that the present technology can be used in other environments.

Figure 2:
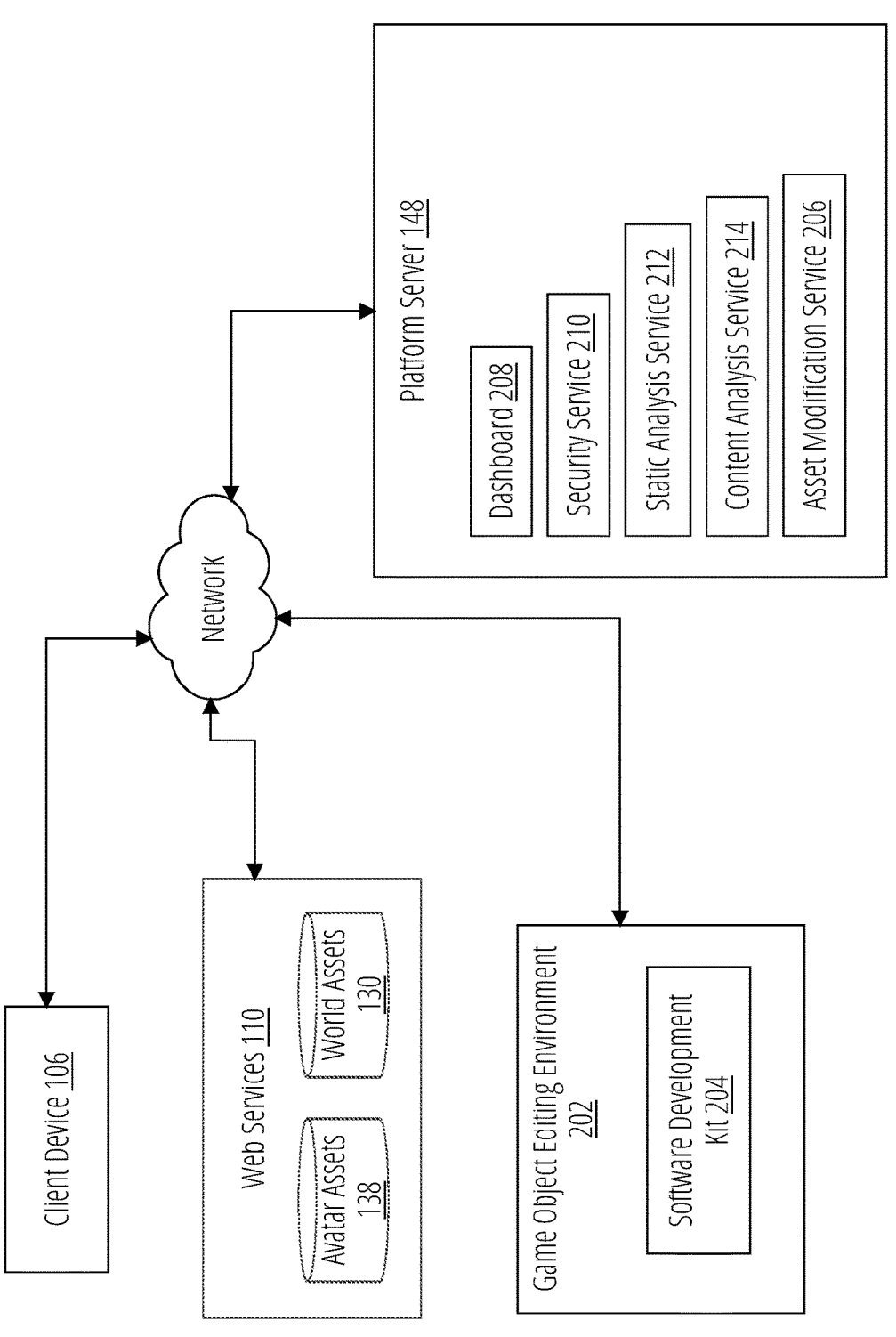
FIG. 2 illustrates an example system for managing user-created game objects to provide a secure and predictable game performance on a client device in accordance with some aspects of the present technology.

FIG. 2 illustrates an example system for analyzing a user-created game object at a platform server to characterize features and performance statistics of the user-created game object in accordance with some aspects of the present technology. Although the example system depicts particular system components or services and an arrangement of such components and services, this depiction is to facilitate a discussion of the present technology and should not be considered limiting unless specified in the appended claims.

Users can create user-created game objects using the game object editing environment 202. In some embodiments, the game object editing environment 202 can operate on a client device, which could be client device 106, but as illustrated in FIG. 1 and FIG. 2 client device 106 is provided primarily to illustrate a player's client device 106 running client application 104.

The game object editing environment 202 can be a software development platform for developing software, and especially games, virtual worlds, avatars, etc. Some examples of well-known game object editing environments include UNITY and UNREAL. Game object editing environments 202 can include a software development kit 204 that is provided by the platform server 148. The software development kit 204 can include a variety of assets that are approved for use by users creating user-created game objects as well as tools to aid in the creation of the user-created game objects. Additionally, the software development kit 204 can provide a collection of policies for attributes of acceptable user-created game objects. The software development kit 204 can also include software for performing checks and analysis on the user-created game objects before they are uploaded to platform server 148.

Accordingly, users can create their user-created game objects in the game object editing environment 202 using the functions of the game object editing environment 202 along with the installed software development kit 204. As will be described herein the software development kit 204 includes a variety of functions for performing checks and analysis on the user-created game objects.

Users can compile their user-created game object and upload it to the platform server 148. Generally, users need to compile their user-created game object separately for any distribution platform on which they want the user-created game object to be available.

The platform server 148 can perform a variety of inspections and analyses of the uploaded user-created game objects. For example, the platform server 148 can include a static analysis service 212 that can analyze an asset bundle containing the user-created game object and associated assets. As described herein the static analysis service 212 can analyze the asset bundle to determine whether any assets making up the user-created game object are malformed or prohibited. The static analysis service 212 can also collect statistics regarding the user-created game object that can be used to determine how long the user-created game object might take to download and to determine how efficiently the user-created game object will run.

The platform server 148 can also perform a variety of security services using security service 210. For example, the security service 210 can evaluate the compiled user-created game objects by loading these user-created game objects in a sandboxed environment to ensure that the compiled user-created game objects are safe to run on the supported distribution platforms. The security service 210 can attempt to run or load a user-created game object in a virtual environment that is a simulation of a distribution platform. The security service 210 can collect runtime information to ensure that the user-created game object does not harbor any malicious code.

The platform server 148 can also include a content analysis service 214 that can analyze assets of the user-created game object to identify types of content and flag content that might not be desirable to some players. In some aspects, the content analysis service 214 might also be able to determine when a user-created game object contains an asset that is in violation of a content moderation rule.

In some embodiments, platform server 148 can identify one or more assets of the user-created game objects as needing modifications and can attempt to modify the user-created game object using the asset modification service 206. In one example, an asset might include one or more assets that will perform poorly on some distribution platforms or player devices, and the asset modification service 206 can create a simplified variant of the user-created game object that will perform better on some devices. In another example, the user-created game object might contain content not permitted by the moderation rules, or contain scripts or shaders that are not from a permitted list and can be removed from the user-created game object. In some embodiments, the user-created game object might be compiled for use on a specific distribution platform, and the asset modification service 206 can modify the user-created game object to create variants of the user-created game object that will work on other distribution platforms.

An example of a distribution platform includes different client devices 106 and their operating systems. For example, some common client devices include personal computers, running the STEAM gaming platform, virtual reality headsets, such as the OCULUS family of devices by META, the VISION PRO by APPLE INC., the VIVE family of headsets by HTC, etc., and even mobile devices such as iOS devices by APPLE, and ANDRIOD devices by a variety of manufactures. All of these distribution platforms can be updated over time, and accordingly, the asset modification service 206 can keep the assets of the user-created game objects up-to-date for distribution.

Once a user-created game object is ready for distribution, platform server 148 can save the compiled user-created game object, such as an avatar or a world in the world assets database 130 or avatar assets database 138 so that the client application 104 can access these assets as described in FIG. 1 above.

The platform server 148 can also include a dashboard 208 that can be used to display information about user-created game objects, and the status of the user-created game objects as reported by platform server 148. For example, the dashboard 208 can be used to inform creators of user-created game objects of security concerns with some assets of a user-created game object, or inform a user of different platforms in which the user-created game object has been compiled, and is ready for distribution on those platforms.

FIG. 3 illustrates an example routine for analyzing a user-created game object at a platform server to characterize features and performance statistics of the user-created game object in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving the user-created game object at block 302. For example, the platform server 148 illustrated in FIG. 1 may receive the user-created game object at the platform server. The user-created game object can be transmitted in the form of an asset bundle that includes the assets making up the user-created game object. The asset bundle can include the user-created game object that has been compiled for use in a particular distribution platform and can include a manifest referencing additional assets that are referenced by the user-created game object or a part of the user-created game object.

According to some examples, the method includes analyzing the assets making up the user-created game object at block 304. For example, the platform server 148 illustrated in FIG. 1 may analyze the assets making up the user-created game object. The assets making up the user-created game object can be analyzed to determine metadata for the asset bundle and the assets within it, as well as to derive statics about the user-created game object that can be used to estimate how efficiently the user-created game object will perform if loaded onto a distribution platform. The analysis can also include determining whether the assets are organized properly to be able to be loaded by the client application 104, and whether the user-created game object includes any unsafe or vulnerable assets. The process of analyzing the assets making up the user-created game object is addressed in more detail with respect to FIG. 4.

According to some examples, the method includes generating estimated performance data from the analysis of the assets making up the user-created game object at block 306. For example, the platform server 148 illustrated in FIG. 1 may generate estimated performance data from the analysis of the assets making up the user-created game object. The estimated performance data is an indication of a download parameter or a processing parameter. An example can be the file size of the user-created game object, such that a very large user-created game object might not perform well on a network connection with poor bandwidth. Another example can be a number of shapes making up a game object. The greater the number of shapes making up a game object that needs to be rendered the greater the graphics processing resources that might be required. For example, a statistic might be that the avatar includes 20,000 triangles such that it might consume a lot of resources to render such an avatar on a computing device with fewer graphics resources, like a mobile device.

According to some examples, the method includes sending the user-created game object for publication by the web services at block 308. For example, the platform server 148 illustrated in FIG. 1 may send the user-created game object for publication by the web services so that the user-created game object can be downloaded by client applications 104.

According to some examples, the method includes storing the user-created game object at block 310. For example, the web services 110 illustrated in FIG. 1 may store the user-created game object.

According to some examples, the method includes requesting a listing of user-created game objects at block 312. For example, the client application 104 illustrated in FIG. 1 may request the listing of user-created game objects from the web services 110. For example, the client application 104 can request a listing of virtual world user-created game objects from the worlds API 128 and request a listing of avatar user-created game objects from the avatars API 136.

According to some examples, the method includes receiving a request from the client device for a listing of available user-created game objects at block 314. For example, the web services 110 illustrated in FIG. 1 may receive a request from the client device for a listing of available user-created game objects. The request is received through an avatars API 136 or a worlds API 128.

Responsive to the request for the user-created game objects, the method includes sending the listing of the available user-created game objects at block 316. For example, the web services 110 illustrated in FIG. 1 may send the listing of the available user-created game objects along with tags indicating features, content, and estimated performance data. The estimated performance data can include performance buckets including good performance, poor performance, and very poor performance, or can include statistics that can indicate that the user-created game object might perform well or poorly. The list of user-created game objects can also include other tags that might identify features of the user-created game object or content labels that can inform users whether a user-created game object is associated with any content that might not be wanted or suitable to certain audiences.

According to some examples, the method includes receiving the estimated performance data for the user-created game objects at block 318. For example, the client application 104 illustrated in FIG. 1 may receive the estimated performance data for the user-created game objects.

According to some examples, the method includes presenting the listing of the available user-created game objects along with tags indicating the features, the content, and the estimated performance data for respective user-created game objects in a user interface at block 320. For example, the client application 104 illustrated in FIG. 1 may present the listing of the available user-created game objects along with tags indicating the features, the content, and the estimated performance data for respective user-created game objects in a user interface. A player can review the listing of user-created game objects using their client application 104 and utilize the tags indicating the features, the content, and the estimated performance data to make a decision on a virtual world or avatar to select.

In some embodiments, a user may have provided options to their client application 104 regarding user-created game objects that they would like filtered and not presented. In some embodiments, certain distribution platforms might also be associated with some criteria for which user created-game user-created game objects can be downloaded and run on the client device or should not be downloaded. According to some examples, the method includes determining whether the estimated performance data meets download criteria specific to the client device at block 322. For example, the web services 110 illustrated in FIG. 1 may determine whether the estimated performance data meets download criteria specific to the client device. The web services 110 might include configurations that prevent a user-created game object with too many shapes per unit of area from being run on client devices that do not have robust graphics processing capabilities. In another example, the web services 110 might include configurations that prevent client devices from downloading user-created game objects that are above a threshold size in megabytes when the client devices are on a slow connection or on a public mobile internet connection.

According to some examples, the method includes preventing the download of the user-created game object when the estimated performance data does not meet the download criteria at block 324. For example, the web services 110 illustrated in FIG. 1 may prevent the download of the user-created game object when the estimated performance data does not meet the download criteria. In this way, web services 110 can prevent players from wasting bandwidth by downloading user-created game objects that will result in a poor user experience, and can reduce serving costs by not sending these user-created game objects.

Figure 4:
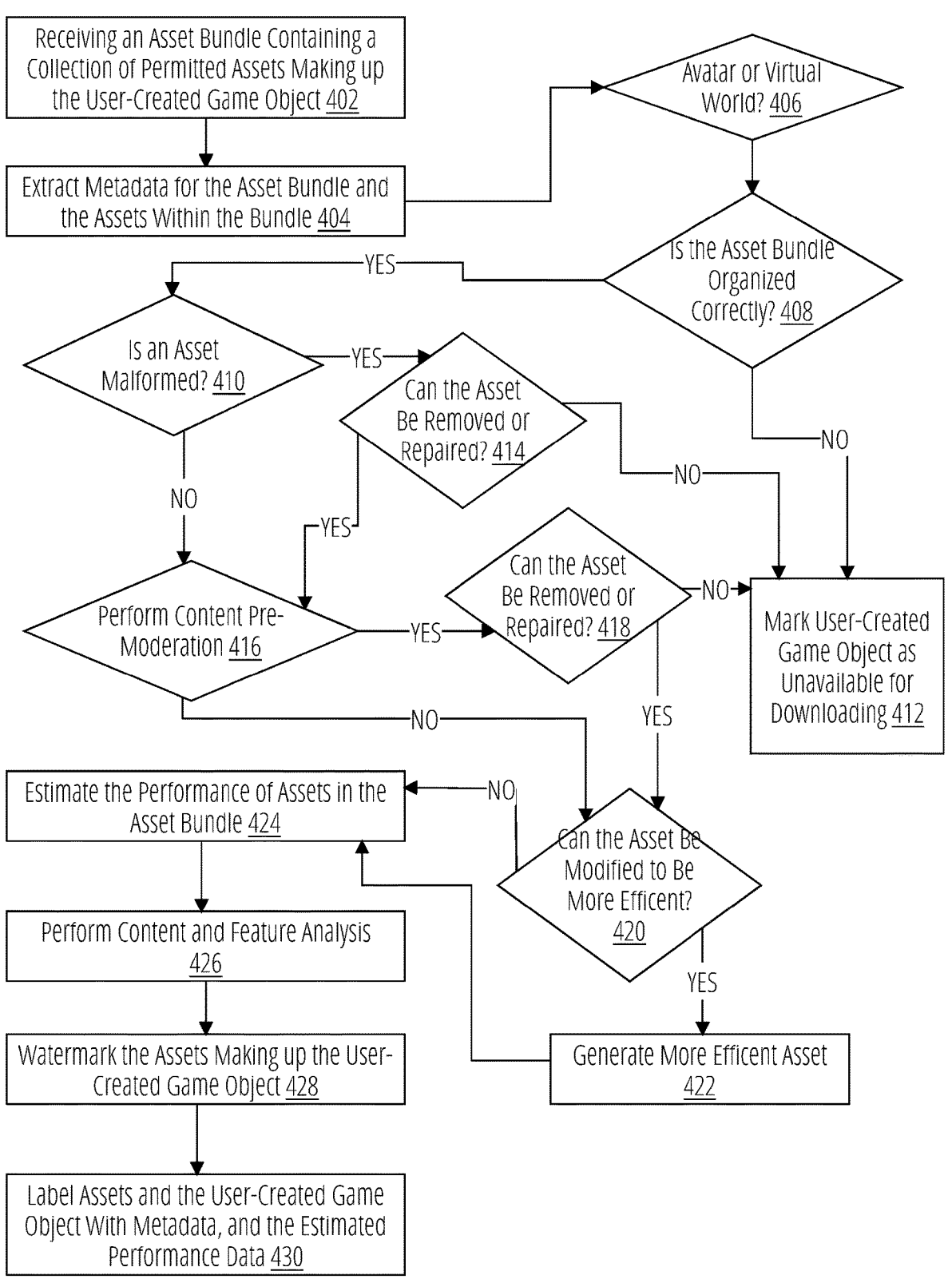
FIG. 4 illustrates an example routine for analyzing user-created game objects, generating statics indicative of the estimated performance of user-created game objects, and modifying user-created game objects in accordance with some aspects of the present technology.

FIG. 4 illustrates an example routine for analyzing user-created game objects, generating statics indicative of the estimated performance of user-created game objects, and modifying user-created game objects in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving an asset bundle containing a collection of permitted assets making up the user-created game object at block 402. For example, the platform server 148 may receive an asset bundle containing a collection of permitted assets making up the user-created game object. The user-created game object the user-created game object can be transmitted in the form of asset bundle that includes the assets making up the user-created game object. The asset bundle can include user-created game object that has been compiled for use in a particular distribution platform, and can include a manifest referencing additional assets that are referenced by the user-created game object or a part of the user-created game object.

An asset bundle can include various resources and components that are bundled together for efficient distribution and use within the virtual world platform 102. Some common elements that may be included in an asset bundle include 3D Models, textures, animations, audio, shaders and materials, and preconfigured objects. The 3D Models can include character models, objects, environments, or any other 3D assets that can be used in the virtual world platform 102. Textures include images used to provide color and detail to the 3D models. Textures can include things like diffuse maps, normal maps, specular maps, and other types of image files. Animations can include as character animations, object manipulations, or any other type of motion used in a virtual world. Audio files, such as music, sound effects, or voice-overs can be played within the virtual world platform 102. Shaders and Materials can define the visual properties of the 3D models, such as how they react to light and how different materials are represented. Prefabs are preconfigured objects or components that can be easily placed in a user-created game object, reducing the need for manual setup.

According to some examples, the method includes extracting metadata for the user-created game object and the assets making up the user-created game object at block 404. For example, the platform server 148 may extract metadata for the assets making up the user-created game object in the asset bundle. The metadata can be used to help determine the estimated performance data. For example, the file sizes for the asset bundle, or any of the assets in the asset bundle may a good indication of the expected download time for the asset bundle or assets in the asset bundle.

For more advanced aspects of the analysis, it can be useful to determine whether the user-created game object is an avatar or a virtual world such as illustrated at decision block 406. For example, the platform server 148 may determine whether the user-created game object is an avatar or a virtual world. The type of user-created game object can be used to perform a more specific analysis of the user-created game object. For example, avatars might require certain attributes or organization of the asset bundle, while virtual worlds might require different attributes or organization of the asset bundle.

According to some examples, the method includes checking the organization of an asset bundle containing the assets making up the user-created game object at decision block 408. For example, the platform server 148 may check the organization of an asset bundle containing the assets making up the user-created game object. A proper organization of an asset bundle can be defined by a software development kit provided by the virtual world platform 102.

A simple check of the organization of the asset bundle can be to attempt to open and read the asset bundle. If the platform server 148 can read the asset bundle or one of the assets in the asset bundle, this is a quick check to determine that the asset bundle is not organized correctly and it can be marked non-compliant at block 412. Even when the assets can be read by the platform server 148, the asset bundle can be marked non-compliant when it fails a requirement of the software development kit. One example is that an avatar asset bundle needs to have an avatar descriptor.

According to some examples, the method includes analyzing the assets in an asset bundle containing the assets making up the user-created game object to determine if an asset is malformed at decision block 410. For example, the platform server 148 may analyze the assets in an asset bundle containing the assets making up the user-created game object to determine if an asset is malformed. Determining that an asset is malformed can also be a function of an analysis that is specific to avatar assets or virtual world assets.

In general, an asset might be considered malformed when it can be opened and read by the platform server 148, but the asset includes content that could be considered risky, and that is not part of a permitted list. An example of this type of content can include scripts. Scripts can be allowed when they are known scripts from a permitted list identified in the software development kit. Scripts in the permitted list might be one of the Prefab assets in the asset bundle. In some instances, the scripts might be in the permitted list, but the script was not obtained from a trusted source. In such instances, the non-permitted scripts might not be allowed.

Another example of user-created game object assets that might be considered malformed are certain assets that are formed in a way that has been observed to crash client applications 104. Since these are user-created game objects, the assets can be malformed accidentally by unskilled content creators or can be intentionally malformed by bad actors. For example, malformed shaders can cause graphics systems on client devices 106 to crash.

When an asset has been determined to be malformed, the method includes removing or repairing the malformed asset at decision block 414. For example, the platform server 148 may remove or repair the malformed asset when it is determined that the asset is malformed. For example, assets that are not allowed can be removed assuming the asset will continue to function without the asset. When the malformed asset is a script that appears to be from a permitted list, but was not obtained from a trusted source, the script can be replaced with a version from the trusted source. When a malformed asset cannot be removed or repaired, the method can proceed to block 412, and the method can terminate, but when the malformed asset can be repaired, or replaced by the asset from a trusted source, or removed, the method can proceed to decision block 416.

According to some examples, the method includes performing a content pre-moderation process on the user-created game object to remove prohibited content or features at decision block 416. For example, the platform server 148 may perform a content pre-moderation process on the user-created game object to remove prohibited content or features. When the analysis of the user-created game object demonstrates that the user-created game object is going to violate the software development kit or terms of service of the virtual world platform 102, the platform server 148 can take pre-moderation steps to either reject the user-created game object or to remove the offending portions of the user-created game object.

In some embodiments, content that was flagged in the routine illustrated in FIG. 4 can also be passed to a human-reviewed moderation team, which can override flags or other concerns raised at various steps. It is possible that content that was not previously approved by the software development kit can become approved through human review.

When an asset has been determined to include content that is subject to moderation, the method includes removing or repairing the moderated asset at decision block 418. For example, the platform server 148 may remove or repair the content to remove the content or the portions of the content subject to moderation. For example, assets with content that is not allowed can be removed assuming the asset will continue to function without the asset. When the moderated content cannot be removed or repaired, the method can proceed to block 412, and the method can terminate, but when the moderated content can be repaired, or removed, the method can proceed to decision block 420.

According to some examples, the method includes determining that the user-created game object or the asset making up the user-created game object can be modified to be more efficient at decision block 420. For example, the platform server 148 may determine that the user-created game object or the asset making up the user-created game object can be modified to be more efficient.

When an asset of the user-created game object is of a type and character that can be made more efficient, the method includes modifying the user-created game object or the asset making up the user-created game object to create a variant of the user-created game object that is more efficient than an original of the user-created game object at block 422. For example, the platform server 148 may modify the user-created game object or the asset making up the user-created game object to create a variant of the user-created game object that is more efficient than an original of the user-created game object.

One type of asset that can be made more efficient in some instances is objects with an excessive number of shapes per unit of area. The platform server 148 may be able to remove some of the geometry to make a more efficient variant of the asset. In some instances, a more efficient variant might be offered to a client device 106 that has less robust graphics processing capabilities, whereas the original version might be offered to more capable client devices 106 having powerful graphics processing units.

Another type of asset that can be made more efficient is avatars. Avatars commonly require more assets in the asset bundle when being distributed to a local player 116 using the avatar, but require less assets when being distributed to a remote player 124 that merely views the avatar in a virtual world. In a similar type of example, simplified versions of avatars can be created by replacing complex patterns exhibited on the avatar with images of the avatar that can be easier to render.

When an asset can be made more efficient, both the original version and the more efficient version can be stored in the avatar assets database 138 or world assets database 130

According to some examples, the method includes generating estimated performance data from the analysis of the assets making up the user-created game object at block 424. For example, the platform server 148 illustrated in FIG. 1 may generate estimated performance data from the analysis of the assets making up the user-created game object. The estimated performance data is an indication of a download parameter or a processing parameter. An example can be the file size of the user-created game object, such that a very large user-created game object might not perform well on a network connection with poor bandwidth. Another example can be a number of shapes making up a game object. The greater the number of shapes making up a game object that needs to be rendered the greater the graphics processing resources that might be required. For example, a statistic might be that the avatar includes 20,000 triangles such that it might consume a lot of resources to render such an avatar on a computing device with fewer graphics resources, like a mobile device.

According to some examples, the method includes performing content and feature analysis on the user-created game object to identify features and content in the user-created game object and to label the user-created game object with tags identifying the features and content at block 426. For example, the platform server 148 may perform content and feature analysis on the user-created game object. The content and feature analysis seeks to identify and label features and content associated with the user-created game objects. In the context of avatars, some examples of features might include a number of body tracking points for which an avatar is configured to support, whether the avatar is configured for secondary motion (where hair and clothes move separately, but in relation to an avatars movements), whether the avatar is enabled for contact interactions, whether the avatar includes any scripts or animations and possibly a description of such. In the context of virtual worlds features might include whether the virtual world is a game or a virtual world for roaming about, what activities are available in the world, attributes or a description about the virtual world, and whether the virtual world includes any scripts or animations and possibly a description of such.

Content analysis for both avatars and virtual worlds can be directed to identifying content that some players might not want to experience or at least want to be notified of. For example, if a virtual world or avatar has any adult theme, violent theme, etc. content tags can be provided to identify such content.

In some embodiments, the user-created game object already includes user-provided content and feature labels that only need to be extracted.

In some embodiments, the platform server 148 needs to perform an analysis of the user-created game objects. For example, the platform server 148 might use a large language model that is able to read and parse the code and organization of the asset bundle and describe its contents.

According to some examples, the method includes watermarking the assets making up the user-created game object after analyzing the assets making up the user-created game object at block 428. For example, the platform server 148 may watermark the assets making up the user-created game object. The watermarking is a method by which the platform server 148 can embed content or an identifier in the user-created game objects so that the system can verify that any user-created game object has been through the review process, and so the virtual world platform 102 can avoid copying of assets.

In some embodiments, the watermark can be derived from an identifier of the content within the user-created game object. In this way, a user is prevented from copying a watermark from a previously approved user-created game object but introducing new assets into the asset bundle. The new or different assets will cause the platform server 148 to derive a different identifier for the content and when the identifier does not match the watermark, it is then apparent that the user-created game object needs to be analyzed. The check of the watermark can occur when content is uploaded to platform server 148 and when a client application 104 attempts to load the user-created game object.

According to some examples, the method includes labeling assets and the user-created game object with metadata, and the estimated performance data at block 430. For example, the platform server 148 may label assets and the user-created game object with metadata, and the estimated performance data as well as any feature or content labels.

In some embodiments, there may be legacy user-created game objects that have not been analyzed by the present technology or other user-created game object game objects that were not yet analyzed. For these user-created game objects, the web services 110 can receive a request to load the user-created game object, but instead of serving the requested user-created game object, the web services 110 can send the client application a notification that the user-created game object can't be downloaded until it has been analyzed. The web services 110 can queue the user-created game object to be analyzed and can notify the client application 104 when the user-created game object has been analyzed.

While the methods and sequences addressed above include specific steps, it should be understood that some steps can be omitted or can occur in a different order or can include additional steps.

For example, the present technology could provide an option for what type of processing should occur on the asset bundle. For example, there could be a "scan only" mode that makes no effort to modify the content at decision block 414, decision block 418, or decision block 420. If the asset bundle includes assets that are not allowed, the method could mark the user-created game object as unavailable. There could also be a "security variant" mode which would perform more similarly to how FIG. 4 is depicted and would attempt to create the security variant by modifying the bundle where needed.

Figure 5:
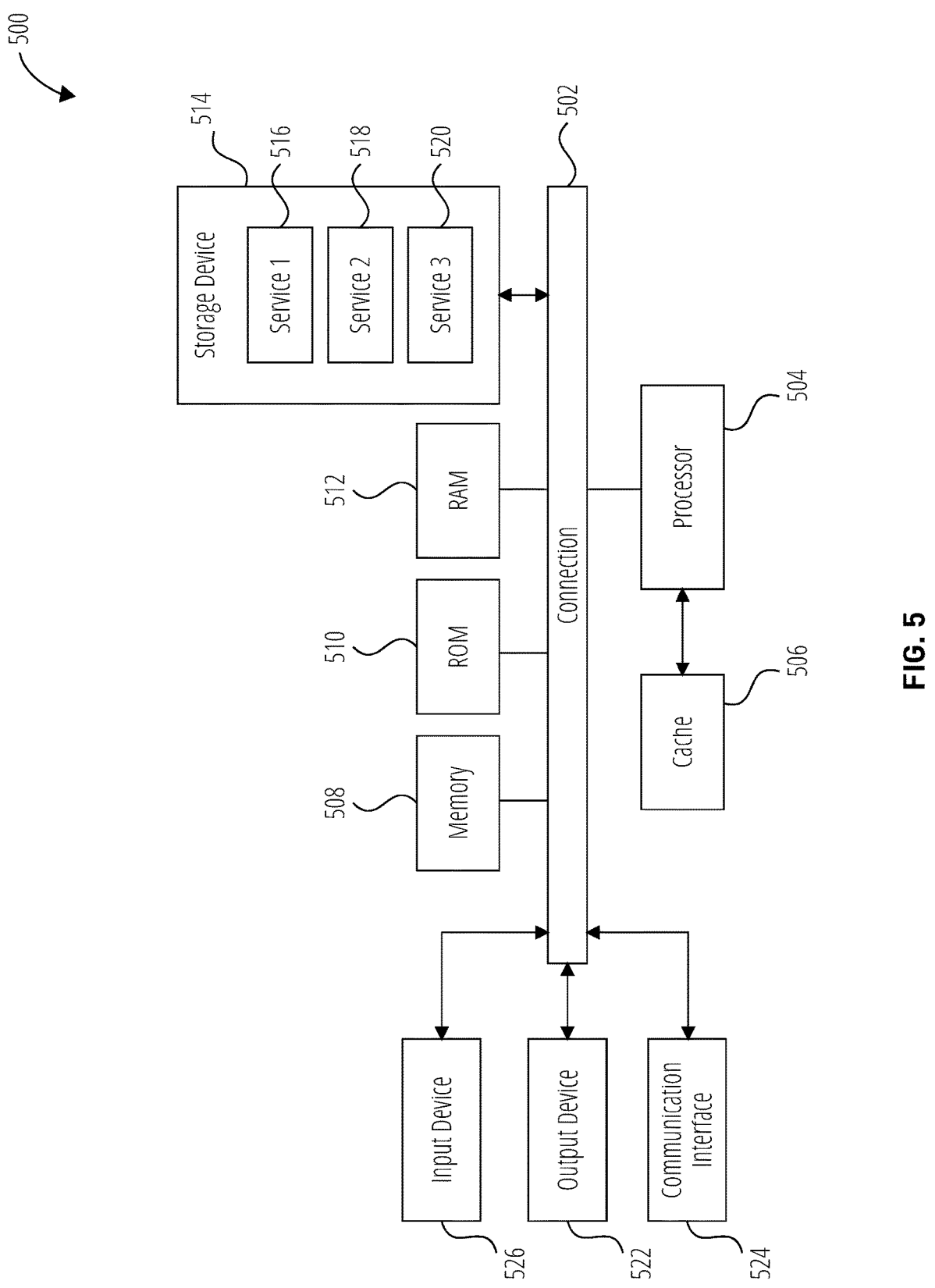
FIG. 5 shows an example of a system for implementing certain aspects of the present technology.

FIG. 5 shows an example of computing system 500, which can be for example any computing device making up client device 106, web services 110, game object editing environment 202, platform server 148, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The present technology includes computer-readable storage mediums for storing instructions, and systems for executing any one of the methods embodied in the instructions addressed in the aspects of the present technology presented below:

Aspect 1. A method comprising: receiving the user-created game object at the platform server; analyzing the assets making up the user-created game object; generating estimated performance data from the analyzing of the assets making up the user-created game object, the estimated performance data being an indication of a download parameter or a processing parameter; and in response to a request for the user-created game object received from a client device, providing the estimated performance data to the client device, whereby the client device can determine whether to download the user-created game object.

Aspect 2. The method of Aspect 1, wherein the estimated performance data can include performance buckets including good performance, poor performance, and very poor performance.

Aspect 3. The method of any of Aspects 1 to 2, wherein the analyzing the assets making up the user-created game object further comprises: extracting metadata for the user-created game object and the assets making up the user-created game object, wherein the user-created game object is stored as an asset bundle that includes the assets making up the user-created game object, wherein the metadata is provided to the client device along with the estimated performance data.

Aspect 4. The method of any of Aspects 1 to 3, wherein the analyzing the assets making up the user-created game object further comprises: determining whether the user-created game object is an avatar or a virtual world; and analyzing the assets making up the user-created game object for compliance with guidelines in a software development kit for the avatar or virtual world, respectively.

Aspect 5. The method of any of Aspects 1 to 4, when the user-created game object is an avatar, determining that an avatar descriptor is present in the asset bundle.

Aspect 6. The method of any of Aspects 1 to 5, wherein the analyzing the assets making up the user-created game object further comprises: checking an organization of an asset bundle containing the assets making up the user-created game object; and marking the user-created game object as non-compliant when it is determined that the asset bundle is not compliant with a software development kit guideline.

Aspect 7. The method of any of Aspects 1 to 6, wherein the analyzing the assets making up the user-created game object further comprises: analyzing the assets in an asset bundle containing the assets making up the user-created game object to determine if an asset is malformed.

Aspect 8. The method of any of Aspects 1 to 7, wherein the asset is malformed when it includes a script that is not listed in a permitted list.

Aspect 9. The method of any of Aspects 1 to 8, further comprising: watermarking the assets making up the user-created game object after the analyzing the assets making up the user-created game object.

Aspect 10. The method of any of Aspects 1 to 9, further comprising: determining that the user-created game object or the asset making up the user-created game object can be modified to be more efficient; modifying the user-created game object or the asset making up the user-created game object to create a variant of the user-created game object that is more efficient than an original of the user-created game object.

Aspect 11. The method of any of Aspects 1 to 10, wherein the user-created game object that can be modified to be more efficient is an avatar for distribution to a remote player.

Aspect 12. The method of any of Aspects 1 to 11, further comprising: requesting, by a client device, the user-created game object; receiving, by the client device, the estimated performance data for the user-created game object; determining, by the client device, whether the estimated performance data meets download criteria specific to the client device; sending, by the client device, a response to the platform server to discontinue the download of the user-created game object when the estimated performance data does not meet the download criteria.

Aspect 13. The method of any of Aspects 1 to 12, further comprising: receiving a request from the client device for a listing of available user-created game objects, wherein the request is received through an avatars API or a worlds API; sending the listing of the available user-created game objects along with tags indicating features, content, and estimated performance data.

Aspect 14. The method of any of Aspects 1 to 13, further comprising: presenting the listing of the available user-created game objects along with tags indicating the features, the content, and the estimated performance data for respective user-created game objects in a user interface.

Aspect 15. The method of any of Aspects 1 to 14, further comprising: performing content and feature analysis on the user-created game object to identify features and content in the user-created game object and to label the user-created game object with tags identifying the features and content, wherein the user-created game object is analyzed using an artificial intelligence tool to identify the features and the content.

Aspect 16. The method of any of Aspects 1 to 15, further comprising: performing a content pre-moderation process on the user-created game object to remove prohibited content or features.

Aspect 17. The method of any of Aspects 1 to 16, further comprising: receiving a request to download a user-created game object that has not been analyzed; notify the client application that the user-created game object can't be downloaded until it has been analyzed; and queue the user-created game object to be analyzed.

What is claimed is:

1. A method for analyzing a user-created game object at a platform server to characterize features and performance statistics of the user-created game object, the method comprising:

receiving a user-created game object at the platform server;

analyzing assets making up the user-created game object;

generating estimated performance data from the analyzing of the assets making up the user-created game object, the estimated performance data being an indication of a download parameter or a processing parameter; and in response to a request for the user-created game object received from a client device, providing the estimated performance data to the client device, whereby the client device can determine whether to download the user-created game object.

2. The method of claim 1, wherein the analyzing the assets making up the user-created game object further comprises:

extracting metadata for the user-created game object and the assets making up the user-created game object, wherein the user-created game object is stored as an asset bundle that includes the assets making up the user-created game object, wherein the metadata is provided to the client device along with the estimated performance data.

3. The method of claim 1, wherein the analyzing the assets making up the user-created game object further comprises:

determining whether the user-created game object is an avatar or a virtual world; and analyzing the assets making up the user-created game object for compliance with guidelines in a software development kit for the avatar or the virtual world, respectively.

4. The method of claim 1, wherein the analyzing the assets making up the user-created game object further comprises:

checking an organization of an asset bundle containing the assets making up the user-created game object; and marking the user-created game object as non-compliant when it is determined that the asset bundle is not compliant with a software development kit guideline.

5. The method of claim 1, wherein the analyzing the assets making up the user-created game object further comprises:

analyzing the assets in an asset bundle containing the assets making up the user-created game object to determine is an asset is malformed; and removing or repairing the malformed asset when it is determined that the asset is malformed.

6. The method of claim 1, further comprising:

determining that the user-created game object or the asset making up the user-created game object can be modified to be more efficient;

modifying the user-created game object or the asset making up the user-created game object to create a variant of the user-created game object that is more efficient than an original of the user-created game object.

7. The method of claim 1, further comprising:

receiving a request from the client device for a listing of available user-created game objects;

sending the listing of the available user-created game objects along with tags indicating features, content, and estimated performance data.

8. The method of claim 7, further comprising:

presenting the listing of the available user-created game objects along with the tags indicating the features, the content, and the estimated performance data for respective user-created game objects in a user interface.

9. The method of claim 1, further comprising:

performing content and feature analysis on the user-created game object to identify features and content in the user-created game object and to label the user-created game object with tags identifying the features and content.

10. A computing system comprising:

a processor; and a memory storing instructions that, when executed by the processor, configure the system to:

receive a user-created game object at the platform server;

analyze assets making up the user-created game object;

generate estimated performance data from the analyzing of the assets making up the user-created game object, the estimated performance data being an indication of a download parameter or a processing parameter; and in response to a request for the user-created game object received from a client device, provide the estimated performance data to the client device, whereby the client device can determine whether to download the user-created game object.

11. The computing system of claim 10, wherein the analyzing the assets making up the user-created game object further comprises:

determine whether the user-created game object is an avatar or a virtual world; and analyze the assets making up the user-created game object for compliance with guidelines in a software development kit for the avatar or the virtual world, respectively.

12. The computing system of claim 10, wherein the analyzing the assets making up the user-created game object further comprises:

check an organization of an asset bundle containing the assets making up the user-created game object; and mark the user-created game object as non-compliant when it is determined that the asset bundle is not compliant with a software development kit guideline.

13. The computing system of claim 10, wherein the analyzing the assets making up the user-created game object further comprises:

analyze the assets in an asset bundle containing the assets making up the user-created game object to determine is an asset is malformed; and remove or repair the malformed asset when it is determined that the asset is malformed.

14. The computing system of claim 10, wherein the instructions further configure the system to:

determine that the user-created game object or the asset making up the user-created game object can be modified to be more efficient;

modify the user-created game object or the asset making up the user-created game object to create a variant of the user-created game object that is more efficient than an original of the user-created game object.

15. The computing system of claim 10, wherein the instructions further configure the system to:

perform content and feature analysis on the user-created game object to identify features and content in the user-created game object and to label the user-created game object with tags identifying the features and content.

16. A non-transitory computer-readable storage medium, the computer-readable storage medium including instructions that when executed by at least one processor, cause the least one processor to:

receive a user-created game object at the platform server;

analyze assets making up the user-created game object;

generate estimated performance data from the analyzing of the assets making up the user-created game object, the estimated performance data being an indication of a download parameter or a processing parameter; and in response to a request for the user-created game object received from a client device, provide the estimated performance data to the client device, whereby the client device can determine whether to download the user-created game object.

17. The computer-readable storage medium of claim 16, wherein the analyzing the assets making up the user-created game object further comprises:

determine whether the user-created game object is an avatar or a virtual world; and analyze the assets making up the user-created game object for compliance with guidelines in a software development kit for the avatar or the virtual world, respectively.

18. The computer-readable storage medium of claim 16, wherein the analyzing the assets making up the user-created game object further comprises:

check an organization of an asset bundle containing the assets making up the user-created game object; and mark the user-created game object as non-compliant when it is determined that the asset bundle is not compliant with a software development kit guideline.

19. The computer-readable storage medium of claim 16, wherein the analyzing the assets making up the user-created game object further comprises:

analyze the assets in an asset bundle containing the assets making up the user-created game object to determine is an asset is malformed; and remove or repair the malformed asset when it is determined that the asset is malformed.

20. The computer-readable storage medium of claim 16, wherein the instructions further configure the least one processor to:

determine that the user-created game object or the asset making up the user-created game object can be modified to be more efficient;

modify the user-created game object or the asset making up the user-created game object to create a variant of the user-created game object that is more efficient than an original of the user-created game object.

* * * * *